United States Patent
Sato et al.

(10) Patent No.: US 9,850,565 B2
(45) Date of Patent: Dec. 26, 2017

(54) METHOD FOR PRODUCING A GALVANNEALED STEEL SHEET

(71) Applicant: NIPPON STEEL & SUMITOMO METAL CORPORATION, Tokyo (JP)

(72) Inventors: Hironori Sato, Chicago, IL (US); Jun Maki, Kitakyushu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 354 days.

(21) Appl. No.: 14/429,520

(22) PCT Filed: Oct. 3, 2012

(86) PCT No.: PCT/JP2012/075708
§ 371 (c)(1),
(2) Date: Mar. 19, 2015

(87) PCT Pub. No.: WO2014/054141
PCT Pub. Date: Apr. 10, 2014

(65) Prior Publication Data
US 2015/0232977 A1    Aug. 20, 2015

(51) Int. Cl.
| | |
|---|---|
| *C21D 8/02* | (2006.01) |
| *B32B 15/01* | (2006.01) |
| *B32B 15/18* | (2006.01) |
| *C23C 2/06* | (2006.01) |
| *C23C 2/02* | (2006.01) |
| *C23C 2/40* | (2006.01) |
| *C21D 9/46* | (2006.01) |
| *C21D 6/00* | (2006.01) |
| *C22C 38/16* | (2006.01) |
| *C22C 38/14* | (2006.01) |
| *C22C 38/12* | (2006.01) |
| *C22C 38/08* | (2006.01) |
| *C22C 38/06* | (2006.01) |
| *C22C 38/04* | (2006.01) |
| *C22C 38/02* | (2006.01) |
| *C22C 38/00* | (2006.01) |

(52) U.S. Cl.
CPC ............... *C23C 2/02* (2013.01); *B32B 15/01* (2013.01); *C21D 6/001* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 9/46* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C23C 2/40* (2013.01); *Y10T 428/12799* (2015.01)

(58) Field of Classification Search
None
See application file for complete search history.

(56) References Cited

FOREIGN PATENT DOCUMENTS

| | | | |
|---|---|---|---|
| CN | 101151390 A | 3/2008 | |
| JP | 07-286240 | * 10/1995 | ............ C22C 38/00 |
| JP | 2576329 B2 | 1/1997 | |
| JP | 2004-149866 A | 5/2004 | |
| JP | 2004-169160 A | 6/2004 | |
| JP | 2005-281775 A | 10/2005 | |
| JP | 2009-209398 A | 9/2009 | |
| JP | 2009-241090 A | 10/2009 | |
| JP | 2011-001631 A | 1/2011 | |

OTHER PUBLICATIONS

Machine-English translation of JP07-286240, Udagawa Satoru et al., Oct. 31, 1995.*
International Search Report issued in PCT/JP2012/075708, dated Jan. 8, 2013.
Chinese Office Action and Search Report, dated Feb. 22, 2016, for counterpart Chinese Application No. 201280076196.1, with an English translation of the Search Report.

* cited by examiner

*Primary Examiner* — Deborah Yee
(74) *Attorney, Agent, or Firm* — Birch, Stewart, Kolasch & Birch, LLP

(57) ABSTRACT

A galvannealed steel sheet includes: a scale-removed rolled steel sheet; and a galvannealed layer arranged on the scale-removed rolled steel sheet. When ten measurement points of the galvannealed steel sheet are set in a transverse direction by equally dividing a line-segment having a reference length of 50 mm by 10, a minimum P content of the galvannealed layer in the ten measurement points is 50% or more as compared with a maximum P content therein.

8 Claims, No Drawings

METHOD FOR PRODUCING A GALVANNEALED STEEL SHEET

TECHNICAL FIELD

The present invention relates to a galvannealed steel sheet which is subjected to press-forming and which is mainly utilized for automobiles, and relates to a method for producing the same. Specifically, the present invention relates to a galvannealed steel sheet for press-forming which is excellent in surface appearance, and relates to a method for producing the same.

BACKGROUND ART

In recent years, in order to prevent the global warming, it has been required to improve the fuel efficiency of the automobiles. For example, an improvement target for the fuel efficiency of the automobiles has been newly set for emission control of carbon dioxide. In order to improve the fuel efficiency of the automobiles, a weight reduction of an automobile body is effective. Thus, for the weight reduction, it has been required to thin the steel sheet for the automobile body. On the other hand, for the safety of the automobile body, it has been required to strengthen the steel sheet for the automobile body.

In addition to the above mentioned requirements of thinning and strengthening the steel sheet, it has been required for the steel sheet for the automobile body which is press-formed to complex shapes to be excellent in surface corrosion resistance and electrophoretic paintability and to be excellent in surface appearance.

In general, in a high tensile strength steel sheet (HTSS), solid solution strengthening elements such as Si (Silicon), Mn (Manganese), P (Phosphorus), or the like are included in the steel for strengthening the steel sheet.

In the galvannealed steel sheet which includes the elements such as Si, Mn, P, or the like as the chemical composition, surface defects such as line defects, stripe defects, or the like may appear after press-forming. Since the surface defects may remain after painting, the surface defects are undesirable for the surface appearance and have been concerns.

In order to suppress the surface defects, it has been mainly proposed to grind a steel piece (slab) before hot-rolling, to grind a hot-rolled steel sheet or a cold-rolled steel sheet before coating, or the like.

For example, as a method for producing a galvannealed steel sheet which has not many patternlike defects on coating surface and in which a steel sheet including Ti (Titanium) and an ultra-low carbon is utilized for base material, Patent Document 1 discloses a method to considerably reduce an amount of scarfing a cast piece or grinding a steel sheet which has been conducted for suppressing the patternlike defects in a manner that element segregation in the cast piece is suppressed by conducting the electromagnetic stirring during continuous casting. As a method for producing a galvannealed steel sheet which is excellent in the surface appearance, coating adhesion, and formability and in which high-Si-based steel sheet or high-P-based steel sheet is utilized for base material, Patent Document 2 discloses a method to grind a surface of a coating steel sheet so as to control surface roughness Ra to 0.3 to 0.6, to immerse it in galvanizing bath, and thereafter, to conduct heating and alloying treatment.

In general, although P is included in the steel to strengthen the steel sheet, P is the element to be readily segregated. Thus, P which is segregated to a slab surface is elongated along a longitudinal direction of the steel sheet by hot-rolling and cold-rolling, and thereby, a concentrated layer of P is formed in a coil surface. Alloying at the concentrated layer of P is delayed during coating, which causes the line defects of the galvannealed steel sheet. For the problem, as a method for producing a galvannealed steel sheet in which a steel sheet including 0.03% or more of P is utilized for base material, Patent Document 3 discloses a method to grind a surface of a steel sheet by a grinding amount depending on a P content in the steel sheet in order to suppress unevenness in the surface of the steel sheet, and thereafter, to conduct alloying treatment by induction heating in an alloying furnace.

In addition, in order to suppress occurrence of chevron stripes on a surface of a pickled steel sheet, Patent Document 4 discloses a method to pickle a hot-rolled steel sheet under ordinary conditions, and thereafter, to further pickle it so as to dissolve a surface layer by 1.0 µm or more.

In order to suppress the linear pattern defects of the galvannealed steel sheet in a case where a steel sheet including Ti, an ultra-low carbon, and 0.03% or more of P is utilized, for example, the prior arts conduct scarfing a surface of a continuous cast piece by 3 mm or more and further grinding a surface of a steel sheet before coating by 5 µm or more. As a result, the prior arts suppress the occurrence of the patternlike defects after coating and obtain surface quality. Even when a steel sheet including Ti, an ultra-low carbon, and a low P is utilized, in the present situation, the prior arts conduct scarfing a surface of a cast piece by 3 mm or more, grinding a surface of a steel sheet after cold-rolling by 2 µm or more using a brush for heavy duty grinding, and scarfing it after pickling by 1 µm or more in order to suppress the chevron stripes. The above-mentioned situation causes a decrease in yield.

RELATED ART DOCUMENTS

Patent Documents

[Patent Document 1] Japanese Unexamined Patent Application, First Publication No. 2004-149866
[Patent Document 2] Japanese Unexamined Patent Application, First Publication No. 2004-169160
[Patent Document 3] Japanese Patent (Granted) Publication No. 2576329
[Patent Document 4] Japanese Unexamined Patent Application, First Publication No. 2005-281775

SUMMARY OF INVENTION

Technical Problem to be Solved

An aspect of the present invention relates to a galvannealed steel sheet which includes a high tensile strength steel sheet as base material whose base elements correspond to an ultra-low carbon steel for improving formability and which includes P for improving strength. An object of the present invention is to provide the galvannealed steel sheet which is subjected to press-forming and which is excellent in surface appearance even after the press-forming, and is to provide a method for producing the same. In addition, the object of the present invention is to provide the galvannealed steel sheet for the press-forming in which it is possible for the steel sheet to reduce and optimize an amount of surface-removing which is conducted for suppressing surface defects having linear pattern or the like and for obtaining the excellent surface appearance, and is to provide a method for producing the same. In other word, the steel sheet according to the aspect of the present invention is to be excellent in a production cost.

Solution to Problem

The present inventors have thoroughly investigated an occurrence cause of unevenness of P concentration which results in surface defects having linear pattern or the like for a high tensile strength galvannealed steel sheet whose base elements correspond to an ultra-low carbon steel and which includes P for improving strength. As a result, the following knowledge has been found. Alloying rate during galvannealing decreases in an area where P is segregated in a surface part of steel sheet, when a galvanized steel sheet is galvannealed. Unevenness of coating thickness is caused by difference in the alloying rate. The unevenness of coating thickness results in the surface defects having longitudinal pattern (linear pattern) which have whitish or blackish appearance. After conducting press-forming the galvannealed steel sheet having the surface defects, the patterns become excessive because a convex area which forms the linear pattern on steel sheet surface is peeled off. In addition, when P, Ni (Nickel), and Cu (Copper) are segregated to the same part near an interface between scale (oxide layer) and steel of a hot-rolled steel sheet, the segregated part is not pickled and remains even after the pickling. As a result, the surface defects having linear pattern or the like become excessive.

Therefore, in order to suppress the occurrence of the surface defects having linear pattern during the galvannealing after the galvanizing, it is preferable to remove the segregated part where the above elements are segregated near the interface between the scale and the steel after the hot-rolling. As a result of the above removing, a P-segregated part which is harmful to surface quality is simultaneously removed and invalidated.

An aspect of the present invention employs the following.
(1) A galvannealed steel sheet according to an aspect of the present invention includes:
  a scale-removed rolled steel sheet which includes, as a chemical composition, by mass %,
    0.0005% to 0.01% of C,
    0.001% to 1.0% of Si,
    0.01% to 2.0% of Mn,
    0.005% to 0.1% of P,
    0.01% to 0.10% of Al,
    0.02% or less of S,
    0.1% or less of Ni,
    0.1% or less of Cu,
    0.01% or less of N, and
    a balance consisting of Fe and unavoidable impurities; and
  a galvannealed layer arranged on the scale-removed rolled steel sheet,
  wherein, when ten measurement points of the galvannealed steel sheet are set in a transverse direction by equally dividing a line-segment having a reference length of 50 mm by 10,
  a minimum P content of the galvannealed layer in the ten measurement points of the galvannealed steel sheet is 50% or more as compared with a maximum P content therein.
(2) In the galvannealed steel sheet according to (1),
  the scale-removed rolled steel sheet may further include, as the chemical composition, by mass %, at least one selected from
    0.0001% to 0.0050% of B,
    0.001% to 0.1% of Nb,
    0.001% to 0.1% of Ti, and
    0.001% to 0.1% of Mo.
(3) In the galvannealed steel sheet according to (2),
  when ten measurement points of the scale-removed rolled steel sheet are set in the transverse direction by equally dividing a line-segment having a reference length of 50 mm by 10, when a surface part of the scale-removed rolled steel sheet is from a surface of the scale-removed rolled steel sheet to 0.1 µm in depth along a thickness direction, and when a base part of the scale-removed rolled steel sheet is from the surface of the scale-removed rolled steel sheet to more than 2 µm in depth along the thickness direction,
  in each of the ten measurement points of the scale-removed rolled steel sheet, a P content, a Ni content, and a Cu content of the surface part of the scale-removed rolled steel sheet may be respectively 105% to 150% as compared with a P content, a Ni content, and a Cu content of the base part of the scale-removed rolled steel sheet.
(4) In the galvannealed steel sheet according to (1),
  when ten measurement points of the scale-removed rolled steel sheet are set in the transverse direction by equally dividing a line-segment having a reference length of 50 mm by 10, when a surface part of the scale-removed rolled steel sheet is from a surface of the scale-removed rolled steel sheet to 0.1 µm in depth along a thickness direction, and when a base part of the scale-removed rolled steel sheet is from the surface of the scale-removed rolled steel sheet to more than 2 µm in depth along the thickness direction,
  in each of the ten measurement points of the scale-removed rolled steel sheet, a P content, a Ni content, and a Cu content of the surface part of the scale-removed rolled steel sheet may be respectively 105% to 150% as compared with a P content, a Ni content, and a Cu content of the base part of the scale-removed rolled steel sheet.
(5) A method for producing a galvannealed steel sheet includes:
  casting a molten steel which includes, as a chemical composition, by mass %,
    0.0005% to 0.01% of C,
    0.001% to 1.0% of Si,
    0.01% to 2.0% of Mn,
    0.005% to 0.1% of P,
    0.01% to 0.10% of Al,
    0.02% or less of S,
    0.1% or less of Ni,
    0.1% or less of Cu,
    0.01% or less of N, and
    a balance consisting of Fe and unavoidable impurities in order to obtain a slab;
  heating the slab in 1100° C. to 1300° C.;
  hot-rolling the slab after the heating under conditions such that a finishing temperature is in 800° C. to 1050° C. and a coiling temperature is in 500° C. to 800° C. in order to obtain a hot-rolled steel sheet;
  surface-removing the hot-rolled steel sheet within a range in µm of GL expressed by a following Expression 1 or more and GU expressed by a following Expression 2 or less from an interface toward a steel along a thickness direction in order to obtain a scale-removed rolled steel sheet, when ten measurement points of the hot-rolled steel sheet are set in a transverse direction by equally dividing a line-segment having a reference length of 50 mm by 10, when a steel surface part of the hot-rolled steel sheet is from the interface between a scale and the steel to 2 µm in depth toward the steel along the thickness direction, and when a $Ni_{max}$ and a $Cu_{max}$ are respectively a maximum Ni content and a maximum Cu content in mass % of the steel surface part in the ten measurement points of the hot-rolled steel sheet;

galvanizing the scale-removed rolled steel sheet after the surface-removing in order to obtain a galvanized steel sheet; and galvannealing the galvanized steel sheet after the galvanizing in order to obtain a galvannealed steel sheet.

$$GL=(Ni_{max}+0.8\times Cu_{max})\times 0.2 \quad \text{(Expression 1)}$$

$$GU=(Ni_{max}+0.8\times Cu_{max})\times 4 \quad \text{(Expression 2)}$$

(6) In the method for producing the galvannealed steel sheet according to (5), the molten steel may further include, as the chemical composition, by mass %, at least one selected from 0.0001% to 0.0050% of B,
0.001% to 0.1% of Nb,
0.001% to 0.1% of Ti, and
0.001% to 0.1% of Mo.

(7) The method for producing the galvannealed steel sheet according to (6) may include pickling a surface of the scale-removed rolled steel sheet at least before the surface-removing or after the surface-removing.

(8) The method for producing the galvannealed steel sheet according to (5) may include pickling a surface of the scale-removed rolled steel sheet at least before the surface-removing or after the surface-removing.

(9) The method for producing the galvannealed steel sheet according any one of (5) to (8) may include:

cold-rolling the scale-removed rolled steel sheet before the galvanizing under a cold-reduction of 50% to 95%; and annealing the scale-removed rolled steel sheet after the cold-rolling in a temperature which is a recrystallization temperature or higher.

Effects of Invention

The galvannealed steel sheet according to the above aspects of the present invention satisfies the mechanical properties such as tensile strength, is excellent in the formability, includes the galvannealed layer which has not many surface defects such as linear pattern defects, and simultaneously, maintains excellent surface appearance even after press-forming.

In addition, since it is possible for the hot-rolled steel sheet to comparatively reduce and optimize the amount of surface-removing which is conducted for suppressing the surface defects having linear pattern or the like when the galvannealed steel sheet is produced, it is possible to obtain the prominent effects such that the loss of steel and the production cost can be reduced.

DETAILED DESCRIPTION OF PREFERRED EMBODIMENTS

Hereinafter, a preferable embodiment of the present invention will be described in detail.

A galvannealed steel sheet according to an embodiment of the present invention includes a galvannealed layer arranged on a scale-removed rolled steel sheet. Herein, the scale-removed rolled steel sheet is defined as a rolled steel sheet which is subjected to surface-removing in a surface-removing process as explained below. In order to obtain the galvannealed steel sheet which is excellent in surface quality (surface appearance), it is needed to reduce unevenness of P content in the galvannealed layer. Specifically, when equally-spaced ten measurement points of the galvannealed steel sheet are set in a transverse direction by equally dividing a line-segment having a reference length of 50 mm by 10, it is needed to control a minimum P content of the galvannealed layer in the ten measurement points to be 50% or more (and 100% or less) as compared with a maximum P content therein.

When the minimum P content of the galvannealed layer in the ten measurement points is less than 50% as compared with the maximum P content of the galvannealed layer therein, difference in alloying rate during galvannealing after a galvanizing process becomes excessive. As a result, surface defects having linear pattern or the like of the galvannealed steel sheet become excessive. Thus, the P content in the galvannealed layer needs to satisfy the above requirement. It is preferable that the minimum P content of the galvannealed layer in the ten measurement points is 60% or more as compared with the maximum P content of the galvannealed layer therein.

The P content of the galvannealed layer may be measured by using a Glow Discharge Spectroscopy (GDS) or the like. The equally-spaced ten measurement points of the galvannealed steel sheet may be set in the transverse direction by equally dividing the line-segment having the reference length of 50 mm by 10, and thus, the P content in each measurement point may be measured by using the GDS.

In addition, in order to obtain the galvannealed steel sheet which is excellent in the surface quality (surface appearance), it is preferable to reduce unevenness of thickness in the galvannealed layer. Specifically, it is preferable to control a minimum thickness of the galvannealed layer in the ten measurement points to be 50% or more (and 100% or less) as compared with a maximum thickness therein.

When the minimum thickness of the galvannealed layer in the ten measurement points is less than 50% as compared with the maximum thickness of the galvannealed layer therein, a thick area in the galvannealed layer may be peeled off at press-forming the galvannealed steel sheet, and as a result, the surface defects having linear pattern or the like may become excessive. Thus, it is preferable that the thickness of the galvannealed layer satisfies the above requirement. It is more preferable that the minimum thickness of the galvannealed layer in the ten measurement points is 60% or more as compared with the maximum thickness of the galvannealed layer therein.

In consideration of occurrence of the surface defects having linear pattern parallel to a rolling direction, the thickness of the galvannealed layer may be measured on a cross section that is planarly cut along a thickness direction so that an observed section corresponds to the transverse direction perpendicular to the rolling direction of the galvannealed steel sheet. When equally-spaced ten measurement points of the galvannealed steel sheet are set in the transverse direction by equally dividing a line-segment having a reference length of 50 mm by 10, the thickness of the galvannealed layer in each measurement point may be measured by observing the cross section. For example, the observation on the cross section may be conducted under a magnification in which a visual field is to be 1000 μm or less in the transverse direction.

In order to obtain the technical features of the galvannealed steel sheet according to the embodiment, it is preferable that P, Ni, and Cu are not segregate to a steel sheet surface in the scale-removed rolled steel sheet which is the base material of the galvannealed steel sheet. Specifically, it is preferable that, when equally-spaced ten measurement points of the scale-removed rolled steel sheet are set in the transverse direction by equally dividing a line-segment having a reference length of 50 mm by 10, when a surface part of the scale-removed rolled steel sheet is from the surface of the scale-removed rolled steel sheet to 0.1 µm in depth along the thickness direction, and when a base part of the scale-removed rolled steel sheet is from the surface of the scale-removed rolled steel sheet to more than 2 µm in depth along the thickness direction, in each of the ten measurement points of the scale-removed rolled steel sheet, a P content, a Ni content, and a Cu content of the surface part of the scale-removed rolled steel sheet are respectively 105% to 150% as compared with a P content, a Ni content, and a Cu content of the base part of the scale-removed rolled steel sheet.

When the P content, the Ni content, and the Cu content of the surface part of the scale-removed rolled steel sheet are respectively more than 150% as compared with the P content, the Ni content, and the Cu content of the base part of the scale-removed rolled steel sheet, a segregated part of P, Ni, and Cu may remain in the surface of the scale-removed rolled steel sheet even after pickling the scale-removed rolled steel sheet, and thereby, the surface defects having linear pattern or the like in the galvannealed steel sheet may become excessive. When the above contents are less than 105%, an amount of surface-removing for the scale-removed rolled steel sheet may be excessive, and thereby, a time or equipment for surface-removing is further required, which results in a decrease in a yield of the steel. Thus, the P content, the Ni content, and the Cu content of the surface part of the scale-removed rolled steel sheet are to satisfy the above requirement. It is more preferable that the above range is 110% or more and 130% or less.

The P content, the Ni content, and the Cu content of the scale-removed rolled steel sheet may be measured by using the GDS. Herein, a measured average from the surface of the scale-removed rolled steel sheet to 0.1 µm along the thickness direction is regarded as a measurement result of the surface part of the scale-removed rolled steel sheet, and a measured average from the surface to more than 2 µm is regarded as a measurement result of the base part of the scale-removed rolled steel sheet. In addition, it is preferable that a measured depth is more than 2 µm to 4 µm when the base part of the scale-removed rolled steel sheet is measured by using the GDS.

The details which led to the above technical features will be described below.

It is required to thin the steel sheet for improving the fuel efficiency of automobiles and to strengthen the steel sheet for ensuring the safety of automobile bodies. In addition, it is required for the steel sheet for automobile bodies to be excellent in the surface appearance and the press-formability.

For strengthening the steel sheet, P-included steel sheet is utilized as the coating steel sheet. However, P is the element to be readily segregated, P which is segregated to a slab surface is elongated along a longitudinal direction of the steel sheet by hot-rolling and cold-rolling, and thereby, a P-segregated part is formed in a steel sheet surface. When the above steel sheet is subjected to galvannealing treatment, alloying rate during galvannealing becomes uneven in the P-segregated part, and thereby, concavity and convexity of the surface of the galvannealed steel sheet is formed. As a result, the surface defects having linear pattern or the like appear. When the above galvannealed steel sheet is subjected to press-forming, the convex area is peeled off, and thereby, the linear pattern becomes excessive.

The present inventors have thoroughly investigated an occurrence cause of the surface defects having linear pattern or the like for the galvannealed steel sheet which utilizes a high tensile strength hot-rolled steel sheet whose base elements correspond to an ultra-low carbon steel and which includes P for improving strength. As a result, the following knowledge has been found. When P, Ni, and Cu are segregated to the same part near an interface between scale and steel of the hot-rolled steel sheet, the segregated part remains even after the pickling process. Unevenness of coating thickness is formed in the segregated part during the galvannealing after the galvanizing, and thereby, the surface defects having linear pattern or the like appear.

With respect to a segregation mechanism of P, Ni, and Cu, which causes the occurrence of the surface defects having linear pattern or the like on the surface of the galvannealed steel sheet, the following mechanism is considered.

In general, the galvannealed steel sheet is produced by continuous-casting a slab, by heating it in a heating furnace, by hot-rolling it after surface-removing, by coiling it in order to obtain a hot-rolled steel sheet, by cold-rolling and annealing the hot-rolled steel sheet as necessary, and by conducting a galvannealing treatment.

In the heating process of the slab, when the continuously cast slab which includes P, Ni, and Cu is heated in the heating furnace in 1100° C. to 1300° C., Fe (iron) in a slab surface is oxidized and becomes primary scale. However, since Ni and Cu which are steel elements are hardly oxidized, Ni and Cu segregate to the interface between the primary scale and the steel without the oxidation.

Although the primary scale is removed by the scale-removing (descaling) which is conducted as necessary, Ni and Cu which segregate to the steel surface are not removed and still remain. In the hot-rolling process, when the above slab is hot-rolled, Ni- and Cu-segregated part is elongated along the longitudinal direction of the steel sheet, and thereby, the thickness of Ni- and Cu-segregated part is thinned. At the same time, secondary scale is formed by the oxidation of the steel sheet surface during the hot-rolling, and thereby, Ni and Cu further segregate to the steel surface.

During the coiling after the hot-rolling, P segregates to the interface between the scale and the steel or to grain boundaries. When P is segregated to the same part with Ni and Cu, the above P is not removed and remains in the steel surface part even after conducting the pickling process.

When the hot-rolled steel sheet is subjected to the cold-rolling and the annealing as necessary, and thereafter, is subjected to the galvannealing treatment, the surface defects having linear pattern or the like appear. The part where the surface defects appear corresponds to the part where P, Ni, and Cu coincidentally segregate. Thus, it is possible to conclude that the occurrence of the surface defects having linear pattern or the like does not result from only the segregation of P but results from the coincidentally segregation of P, Ni, and Cu to the surface part.

The present inventors have statistically investigated the suppression of the P-segregated part which segregates to the steel sheet surface by using various steel sheets. Since P remains in the part where Ni and Cu segregate, the present inventors have focused attention on the Ni- and Cu-segregated part which is located in the interface between the scale and the steel in the hot-rolled steel sheet. As a result, the following knowledge has been found. Depending on the Ni content and the Cu content in the steel surface part which is from the interface toward the steel, the amount of surface-removing which is required to invalidate P increases correlatively. Specifically, when equally-spaced ten measurement points of the hot-rolled steel sheet are set in the transverse direction by equally dividing a line-segment having a reference length of 50 mm by 10, when the steel surface part of the hot-rolled steel sheet is from the interface between the scale and the steel to 2 μm in depth toward the steel along the thickness direction, and when a $Ni_{max}$ and a $Cu_{max}$ are respectively regarded as a maximum Ni content and a maximum Cu content in mass % of the steel surface part in the ten measurement points of the hot-rolled steel sheet, the hot-rolled steel sheet is subjected to the surface-removing within a range in μm of GL or more and GU or less, GL being expressed by a following Expression A and GU being expressed by a following Expression B, from the interface toward the steel along the thickness direction in order to obtain the scale-removed rolled steel sheet. Thereby, it is possible to remove and invalidate the P-segregated part in addition to the Ni- and Cu-segregated part. In other word, it is difficult to remove the P-, Ni-, and Cu-segregated part by the pickling process, and thus, it is important to conduct the surface-removing so as to control the removing amount to be within the above range in order to remove the segregated part. In addition, the above amount of surface-removing is optimized, and thus, it is possible to sufficiently remove the P-segregated part with the removing amount which is less than that of the prior arts.

$$GL = (Ni_{max} + 0.8 \times Cu_{max}) \times 0.2 \quad \text{(Expression A)}$$

$$GU = (Ni_{max} + 0.8 \times Cu_{max}) \times 4 \quad \text{(Expression B)}$$

The scale-removed rolled steel sheet after the surface-removing is used as the base material and is subjected to the galvannealing, and thereby, it is possible to obtain the galvannealed steel sheet which includes the galvannealed layer without the surface defects having linear pattern or the like and which maintains the excellent surface appearance even after press-forming. In addition, even when the scale-removed rolled steel sheet after the surface-removing is subjected to the cold-rolling process or the annealing process as necessary, and thereafter, is subjected to the galvannealing, it is possible to obtain the same effect as described above.

Next, the chemical composition of the scale-removed rolled steel sheet which is the base material of the galvannealed steel sheet according to the embodiment will be described in detail. In addition, % as described below is mass %.

It is required for an automobile steel sheet to simultaneously satisfy the high tensile strength and the press-formability such as deep drawability. For the scale-removed rolled steel sheet which is the base material of the galvannealed steel sheet according to the embodiment, a high tensile strength steel sheet as base material whose base elements correspond to an ultra-low carbon steel for improving formability and which includes Si, Mn, P, or the like for improving strength may be used. Hereinafter, the reasons for addition and limitation of base elements will be described.

C: 0.0005% to 0.01%

C (carbon) is an element which decreases ductility and r value (Lankford-value) which are related to the press-formability. It is preferable that the C content be small. However, in order to decrease the C content to less than 0.0005%, production cost for steel making is excessive, and thus, it is industrially difficult to control the C content to be less than 0.0005%. On the other hand, when the C content is more than 0.01%, the r value which is a factor of the formability deteriorates, and thus, an upper limit is to be 0.01%. The upper limit may be preferably 0.008%.

Si: 0.001% to 1.0%

Si (silicon) is an element enhancing the steel strength and is utilized in combination to the other strengthening elements. When the Si content is less than 0.001%, the above effect is not obtained. On the other hand, when the Si content is more than 1.0%, Si-oxides are formed on the steel sheet surface, bare spots occur, and coating adhesion deteriorates during the galvanizing. Also, the r value which is a factor of the formability deteriorates the ductility or the r value which is the factor of the formability deteriorates. In order to further enhance the tensile strength, the Si content may be preferably 0.1% or more.

Mn: 0.01% to 2.0%

Mn (manganese) is an element enhancing the steel strength and is utilized in combination to the other strengthening elements. When the Mn content is less than 0.01%, the above effect is not obtained. Also, the production cost for steel making is excessive, and thus, a lower limit is to be 0.01%. On the other hand, when the Mn content is more than 2.0%, the r value which is the factor of the formability deteriorates because the steel sheet is hardened, the galvanizability deteriorates because Mn-oxides are formed on the steel sheet surface, and thus, an upper limit is to be 2.0%. In order to further enhance the tensile strength, the Mn content may be preferably 0.15% or more.

P: 0.005% to 0.1%

P (phosphorus) is an element which is significantly effective in enhancing the steel strength and which almost never has the negative influence of the formability as compared with Si, Mn, or the like. Thus, P is useful for enhancing the steel strength. When the P content is less than 0.005%, the above effect is not obtained. In order to further enhance the tensile strength, the P content may be preferably 0.01% or more. On the other hand, P is an element which delay the galvannealing after the galvanizing, which deteriorates the surface quality by forming the linear pattern on coating surface, and which negatively affects the spot weldability. Thus, an upper limit of the P content is to be 0.1%.

Al: 0.01% to 0.10%

Al (aluminum) is a deoxidizing element of the steel and an element enhancing the steel strength. When the Al content is less than 0.01%, the above effect is not obtained. Also, the oxides remain because the deoxidation is insufficient, and thus, the formability deteriorates. On the other hand, when the Al content is more than 0.10%, the r value which is the factor of the formability deteriorates. Thus, an upper limit is to be 0.10%.

In addition to the above base elements, at least one selected from the group consisting of B, Nb, Ti, and Mo may be additionally included as optional elements. Hereinafter, the reasons for addition and limitation of the optional elements will be described. In addition, % as described below is mass %.

B: 0.0001% to 0.0050%

B (boron) has a high affinity for N (Nitrogen), forms the nitrides during solidification or hot-rolling, and thus, has the effects on enhancing the steel strength and enhancing the formability by decreasing the solid-soluted N in the steel. In order to obtain the effects, the B content may be preferably 0.0001% or more. On the other hand, when the B content is more than 0.0050%, a weld zone and a heat affected zone may harden during welding, and thus, the toughness may deteriorate. Also, the strength of the hot-rolled steel sheet may increase, and thus, a cold-rolling load may increase.

Also, the recrystallization temperature may increase, the in-plane anisotropy of the r value which is the factor of the formability may increase, and thus, the press-formability may deteriorate. Thus, the B content may be preferably 0.0001% to 0.0050%. In addition, when the B content is 0% to 0.0050%, the characteristic values of the galvannealed steel sheet are not negatively affected.

Nb: 0.001% to 0.1% Nb (Niobium) has a high affinity for C and N, forms the carbonitrides during solidification or hot-rolling, and thus, has the effects on enhancing the steel strength and enhancing the formability by decreasing the solid-soluted C and N in the steel. In order to obtain the effects, the Nb content may be preferably 0.001% or more. On the other hand, when the Nb content is more than 0.1%, the recrystallization temperature may increase, the in-plane anisotropy of the r value which is the factor of the formability may increase, and thus, the press-formability may deteriorate. Also, the toughness of the weld zone may deteriorate. Thus, the Nb content may be preferably 0.001% to 0.1%. In addition, when the Nb content is 0% to 0.1%, the characteristic values of the galvannealed steel sheet are not negatively affected.

Ti: 0.001% to 0.1%

Ti (titanium) is an element which enhances the steel strength and enhances the formability by decreasing the solid-soluted N by fixing N in the steel as TiN. In order to obtain the effects, the Ti content may be preferably 0.001% or more. On the other hand, when the Ti content is more than 0.1%, the effects may be saturated, on the contrary, the r value which is the factor of the formability may deteriorate by forming TiC. Thus, the Ti content may be preferably 0.001% to 0.1%. The Ti content may be more preferably 0.015% to 0.09%. In addition, when the Ti content is 0% to 0.1%, the characteristic values of the galvannealed steel sheet are not negatively affected.

Mo: 0.001% to 0.1%

Mo (molybdenum) is an element which makes it possible to obtain the slow aging properties, because the aging is suppressed with a small amount of addition. In order to obtain the effects, the Mo content may be preferably 0.001% or more. On the other hand, when the Mo content is more than 0.1%, the effects may be saturated, on the contrary, the formability may deteriorate because the steel sheet is hardened. Thus, the Mo content may be preferably 0.001% to 0.1%. In addition, when the Mo content is 0% to 0.1%, the characteristic values of the galvannealed steel sheet are not negatively affected.

In addition to the above mentioned elements, the scale-removed rolled steel sheet which is the base material of the galvannealed steel sheet according to the embodiment includes unavoidable impurities. Herein, the unavoidable impurities indicate elements such as S, Ni, Cu, N, Mg, Pb, Sb, Sn, Cd, or the like which are unavoidably contaminated from auxiliary materials such as scrap and from the galvanizing process. It is preferable that S, Ni, Cu, and N in the elements are limited to the following in order to obtain satisfactory the effects of the present invention. Since it is preferable that the amount of the unavoidable impurities is as small as possible, the limited range of the unavoidable impurities includes 0%. In addition, % as described below is mass %.

S: 0.02% or less

S (sulfur) is an impurity which is unavoidably contaminated in the steel. When the S content is more than 0.02%, the r value which is the factor of the deep drawability may deteriorate. When the S content is limited to 0% or more and 0.02% or less, the range is acceptable substantially without the negative influence.

Ni: 0.1% or less

Ni is an element which is difficult to be removed at controlling the steel compositions in the steel making, and thus, a small amount of Ni is included (for example, 0.001% or more). When the Ni content is more than 0.1%, some patterns tend to appear on the galvanized steel sheet. Thus, the Ni content is limited to 0% or more and 0.1% or less. In addition, when the Ni content is excessive, the cost may rise because the expensive Ni needs to be consciously added. Thus, an upper limit of Ni is to be 0.1%.

Cu: 0.1% or less

In common with Ni, Cu is also the element which is difficult to be removed at controlling the steel compositions in the steel making, and thus, a small amount of Cu is included (for example, 0.001% or more). When the Cui content is more than 0.1%, some patterns tend to appear on the galvanized steel sheet, the grain boundaries may embrittled, and the cost may rise. Thus, the Cu content is limited to 0% or more and 0.1% or less.

N: 0.01% or less

N is the impurity which is unavoidably contaminated in the steel. When the N content is more than 0.01%, the r value which is the factor of the deep drawability may deteriorate. When the N content is limited to 0% or more and 0.01% or less, the range is acceptable substantially without the negative influence.

Next, the method for producing the galvannealed steel sheet according to the embodiment will be described.

In a casting process, the molten steel which satisfies the above mentioned chemical composition is cast in order to obtain a slab. Although a casting method is not particularly limited, a vacuum casting method, a continuous casting method, or the like may be employed.

In a heating process, the slab is heated in 1100° C. to 1300° C. The reasons why the slab is heated in 1100° C. to 1300° C. are as follows. When the heating is lower than 1100° C., a hot-rolling load increases, and it is difficult to ensure the predetermined finishing temperature for hot-rolling. On the other hand, when the heating is higher than 1300° C., the cost may rise because the energy is excessively used. In addition, as a first scale-removing process after the heating process, the scale-removing (descaling) may be conducted as necessary in order to remove the primary scale on the slab surface.

In a hot-rolling process, the slab after the heating process is hot-rolled under conditions such that the finishing temperature is in 800° C. to 1050° C. and a coiling temperature is in 500° C. to 800° C. in order to obtain the hot-rolled steel sheet. When the finishing temperature for the hot-rolling is lower than 800° C., the duplex grain structure is formed, which causes the unevenness of the material properties. Also, since the rolling temperature is low, the steel strength increases, and the r value which is the factor of the formability deteriorates. On the other hand, when the finishing temperature is higher than 1050° C., the cost may rise because the heating temperature needs to be high. Also, the steel strength may decrease. Thus, the finishing temperature for the hot-rolling is to be 800° C. to 1050° C.

When the coiling temperature is lower than 500° C., a defective shape may occur. On the other hand, when the coiling temperature is higher than 800° C., scale defects tend to be formed. Thus, the coiling temperature is to be 500° C. to 800° C. In addition, as a pickling process after the hot-rolling process and before the below-mentioned surface-removing process, the pickling may be conducted as necessary in order to pickle and remove the scale on the hot-rolled steel sheet.

In a surface-removing process, the hot-rolled steel sheet is surface-removed. Specifically, when equally-spaced ten measurement points of the hot-rolled steel sheet are set in the transverse direction by equally dividing a line-segment having a reference length of 50 mm by 10, when the steel surface part of the hot-rolled steel sheet is from the interface between the scale and the steel to 2 µm in depth toward the steel along the thickness direction, and when the $Ni_{max}$ and the $Cu_{max}$ are respectively regarded as the maximum Ni content and the maximum Cu content in mass % of the steel surface part in the ten measurement points of the hot-rolled steel sheet, the hot-rolled steel sheet is subjected to the surface-removing within a range in µm of GL or more and GU or less, GL being expressed by a following Expression C and GU being expressed by a following Expression D, from the interface toward the steel along the thickness direction in order to obtain the scale-removed rolled steel sheet.

$$GL=(Ni_{max}+0.8\times Cu_{max})\times 0.2 \quad \text{(Expression C)}$$

$$GU=(Ni_{max}+0.8\times Cu_{max})\times 4 \quad \text{(Expression D)}$$

As the surface-removing method, machining is convenient. For example, a wire brush roll, an abrasive grain belt, shot blasting, or the like may be used. However, any methods may be used in so far as the above range of removing is satisfied.

When the removing amount is less than GL in µm, the P-, Ni-, and Cu-segregated part remain in the steel surface part. When the removing amount is more than GU in µm, the time or equipment for removing is further required, the cost rises, and the yield of the steel decreases.

The Ni content and the Cu content in the steel surface part may be measured by using a Glow Discharge Spectroscopy (GDS), an Electron Probe Micro Analyzer (EPMA), or the like. The equally-spaced ten measurement points of the hot-rolled steel sheet may be set in the transverse direction by equally dividing the line-segment having the reference length of 50 mm by 10, and thus, the Ni content and the Cu content in each measurement point may be measured by using the GDS or the EPMA. In a case of using the GDS for the analysis, from a standpoint of saving the measuring time, it is preferable that the GDS measurement is conducted after preliminarily removing the surface scale of GDS test sample. In a case of using the EPMA for the analysis, it is preferable that, after polishing a cross section that is planarly cut along the thickness direction so that the observed section corresponds to the transverse direction perpendicular to the rolling direction of the hot-rolled steel sheet, the EPMA measurement is conducted on the cross section.

In addition, as a pickling process after the surface-removing process, the pickling may be conducted as necessary in order to pickle and remove the surface on the scale-removed rolled steel sheet. Although a pickling method is not particularly limited, a general pickling method such as sulfuric acid, or nitric acid may be applied. As mentioned above, it is preferable to conduct at least one of the pickling process after the hot-rolling process and before the surface-removing process or the pickling process after the surface-removing process and before the below-mentioned galvanizing process, in order to pickle the surface of the scale-removed rolled steel sheet. It is difficult to remove the P-, Ni-, and Cu-segregated part by the pickling process, and thus, it is needed to conduct the surface-removing so as to control the removing amount to be within the above range in order to remove the segregated part. By conducting the pickling process, the adhesion between the scale-removed rolled steel sheet and the galvannealed layer is preferably improved.

In general, P, Ni, and Cu segregate to the interface between the scale and the steel in the steel sheet during the heating process and the hot-rolling process. The segregated part is elongated along the longitudinal direction of the steel sheet by hot-rolling, and thereby, the P-, Ni-, and Cu-segregated part is linearly formed. During the coiling in the hot-rolling process, P further segregates to the interface between the scale and the steel. Ni and Cu are not removed by the pickling. Thus, when the Ni- and Cu-segregated part remains in the steel sheet after the surface-removing process, the Ni- and Cu-segregated part still remains in the steel sheet surface even after conducting the pickling process. P which exists in the Ni- and Cu-segregated part delays the alloying reaction during the galvannealing process, and thereby, the surface defects having linear pattern or the like appear. When P independently segregates, P is removed and invalidated by the pickling process, and thereby, the surface defects having linear pattern or the like hardly appear.

In the method for producing the galvannealed steel sheet according to the embodiment, by optimally conducting the surface-removing for the hot-rolled steel sheet, P which exists in the Ni- and Cu-segregated part is removed and invalidated. The above amount of surface-removing is optimized, and thus, it is possible to sufficiently remove the P-segregated part with the removing amount which is less than that of the prior arts.

In addition, as a cold-rolling process after the surface-removing process or after the pickling process, the scale-removed rolled steel sheet may be cold-rolled as necessary under a cold-reduction of 50% to 95%. By cold-rolling under the cold-reduction of 50% to 95%, it is possible to preferably control the scale-removed rolled steel sheet to be the predetermined thickness in addition to ensuring the r value and the formability. When the cold-reduction is less than 50%, a coil length of the hot-rolled steel sheet may be elongated in the hot-rolling process, and the cost may equipmently rise. On the other hand, when the cold-reduction is more than 95%, the cold-rolling mill for high load may be needed, and the cost may rise. In addition, in a case where both the pickling process and the cold-rolling process are conducted after the surface-removing process, the process order may be the surface-removing process, the pickling process, and the cold-rolling process.

In addition, as an annealing process after the cold-rolling process, the scale-removed rolled steel sheet may be annealed as necessary in a temperature which is the recrystallization temperature or higher. When the annealing is conducted in the temperature which is the recrystallization temperature or higher, the strain derived from the rolling may be relieved, and the formability may be improved by softening. In addition, even when the scale-removed rolled steel sheet is subjected to the cold-rolling process or the annealing process as necessary, it is possible to unchangingly obtain the effects according an aspect of the present invention.

In a galvanizing process after the surface-removing process, after the pickling process, after the cold-rolling process, or after the annealing process, the scale-removed rolled steel sheet is galvanized in order to obtain the galvanized steel sheet. When the galvanizing process is conducted, it is preferable that the scale-removed rolled steel sheet after the annealing process and before the galvanizing process is not cooled and is continuously subjected to the treatment by using the continuous annealing furnace.

In a galvannealing process after the galvanizing process, the galvanized steel sheet is galvannealed in order to obtain the galvannealed steel sheet. At the time, it is preferable that the galvanized steel sheet after the galvanizing process and before the galvannealing process is not cooled and is continuously subjected to the treatment by using the continuous annealing furnace.

EXAMPLE

Hereinafter, the effects of an aspect of the present invention will be described in detail with reference to the following examples. However, the condition in the examples is an example condition employed to confirm the operability and the effects of the present invention, so that the present invention is not limited to the example condition. The present invention can employ various types of conditions as long as the conditions do not depart from the scope of the present invention and can achieve the object of the present invention.

The galvannealed steel sheet was produced by the steel compositions as shown in Table 1 and by the production conditions as shown in Tables 2 and 3. Specifically, the cast piece (slab) as the test material which had the steel compositions as shown in Table 1 was made by the continuous casting. The slab was heated and held in the heating furnace (heating process), was scale-removed (descaling) after being taken out, and was hot-rolled under the conditions such as the finishing temperature and the coiling temperature as shown in Table 2 (hot-rolling process). The surface of the hot-rolled steel sheet after the hot-rolling process was pickled as necessary (pickling process), and the hot-rolled steel sheet was surface-removed in order to obtain the scale-removed rolled steel sheet (surface-removing process). The surface of the scale-removed rolled steel sheet was pickled and cleaned as necessary (pickling process). The scale-removed rolled steel sheet was cold-rolled as necessary to the predetermined thickness (cold-rolling process), and was annealed as necessary in the continuous annealing furnace (annealing process). The scale-removed rolled steel sheet was galvanized by dipping it into the coating bath (galvanizing process), and was galvannealed in order to obtain the galvannealed steel sheet (galvannealing process). In the Tables 2 and 3, for example, "C.O. (Carrying Out)" indicates that the pickling was conducted, and "Not C.O. (Not Carrying Out)" indicates that the pickling was not conducted. The other processes are indicated in the same manner.

In addition, the balance of the steel compositions as shown in Table 1 consisted of Fe and unavoidable impurities. In addition, in the Tables, underlined values indicate out of the range of the present invention.

In the Table 2, the conditions of the surface-removing (surface-removing process) for the hot-rolled steel sheet are shown. Herein, by using the hot-rolled steel sheet before the surface-removing, the $Ni_{max}$ and the $Cu_{max}$ were measured in the steel surface part which was from the interface between the scale and the steel to 2 μm in depth toward the steel along the thickness direction, and the GL and the GU which corresponded to the appropriate range for the surface-removing were calculated in μm. Also, the actual removing amount was shown in the Table 2. In addition, the $Ni_{max}$ and the $Cu_{max}$ were measured by using the Electron Probe Micro Analyzer (EPMA). The ten measurement points of the hot-rolled steel sheet were set in the transverse direction by equally dividing the line-segment having the reference length of 50 mm by 10, and thus, the Ni content and the Cu content in each measurement point were measured by using the EPMA. Herein, the measurement result of the steel surface part was regarded as the measured average from the above interface of the hot-rolled steel sheet to 2 μm toward the steel along the thickness direction. Also, the $Ni_{max}$ and the $Cu_{max}$ were regarded as the maximum Ni content and the maximum Cu content in mass % in the ten measurement points.

Similarly, the P content, the Ni content, and the Cu content were measured in the surface part and the base part of the scale-removed rolled steel sheet after the surface-removing, and thereby, the segregating situation was checked. The ten measurement points of the scale-removed rolled steel sheet were set in the transverse direction by equally dividing the line-segment having the reference length of 50 mm by 10, and thus, the P content, the Ni content, and the Cu content in each measurement point in the ten measurement points were measured by using the GDS. Herein, the measurement result of the surface part of the scale-removed rolled steel sheet was regarded as the measured average from the surface of the scale-removed rolled steel sheet to 0.1 μm along the thickness direction, and the measurement result of the base part of the scale-removed rolled steel sheet was regarded as the measured average from the surface to the range of more than 2 μm to 4 μm. The segregating situation was expressed in percentage by respectively comparing the P content, the Ni content, and the Cu content of the surface part of the scale-removed rolled steel sheet with the P content, the Ni content, and the Cu content of the base part of the scale-removed rolled steel sheet. When the comparing result in each element was within 105% or more and 150% or less, it was judged to be acceptable. The Table 5 shows the measurement result of the segregating situation of P, Ni, and Cu which are expressed as the ratio of the surface part of the scale-removed rolled steel sheet to the base part of the scale-removed rolled steel sheet. Herein, the Table 5 only shows the result of the one measurement point which is the farthest value from 127.5% (intermediate value between 105% and 150%) among the measurement results of the segregating situation of P, Ni, and Cu in the ten measurement points.

For each galvannealed steel sheet of examples and comparative examples which were produced by the above method, the tensile characteristics, the r value (Lankford-value) which is the factor of the deep drawability, and the surface quality were evaluated. The evaluation method will be described below.

The tensile test was conducted, for example, based on JIS Z 2241: 2011 or ISO 6892-1: 2009 by using JIS No. 5 test samples which were prepared from each galvannealed steel sheet so that a tensile direction was perpendicular to the rolling direction and the thickness direction, and the tensile strength (TS) in MPa and the elongation (EL) in % were evaluated as the tensile characteristics. When the tensile strength was 320 MPa or more and the elongation was 20% or more, it was judged to be acceptable.

The r value which was the factor of the deep drawability was measured and evaluated, for example, based on JIS Z 2254: 2008 or ISO 10113-1: 2006 by using JIS No. 5 test samples which were prepared from each galvannealed steel sheet from three directions which were the direction parallel to the rolling direction, the direction making an angle of 45° with the rolling direction, and the direction perpendicular to the rolling direction. For example, the r value may be measured by measuring the thickness change and the width change at the point of approximately 10% tensile deformation in the tensile test and by calculating the ratio of the width change to the thickness change. When $r_0$ was the r value in the direction parallel to the rolling direction, $r_{45}$ was the r value in the direction making the angle of 45° with the rolling direction, and $r_{90}$ was the r value in the direction perpendicular to the rolling direction, the r value was evaluated by $r_{ave}$ which was the average of the r values in the directions and which was calculated using the following Expression E. In the present example, when the $r_{ave}$ was 1.2 or more, it was judged to be acceptable.

$$r_{ave}=(r_0+2\times r_{45}+r_{90})/4 \quad \text{(Expression E)}$$

The surface quality was evaluated by investigating the P content in the galvannealed layer, by investigating the unevenness of the galvannealed layer thickness, and by observing the existence of the patternlike defects.

The P content in the galvannealed layer was measured by using the GDS. The ten measurement points of the galvannealed steel sheet were set in the transverse direction by equally dividing the line-segment having the reference length of 50 mm by 10, and thus, the P content in each measurement point in the galvannealed layer was measured by using the GDS. When the minimum P content in the ten measurement points in the galvannealed layer of the galvannealed steel sheet was 50% or more as compared with the maximum P content therein, it was judged to be acceptable.

The galvannealed layer thickness was measured on the cross section that was planarly cut along the thickness direction so that the observed section corresponded to the transverse direction perpendicular to the rolling direction of the galvannealed steel sheet. The ten measurement points of the galvannealed steel sheet were set in the transverse direction by equally dividing the line-segment having the reference length of 50 mm by 10, and thus, the galvannealed layer thickness in each measurement point was measured by observing the metallographic structure on the cross section. The metallographic structure was observed under the magnification in which the visual field was to be 1000 μm or less in the transverse direction. When the minimum thickness in the ten measurement points in the galvannealed layer of the galvannealed steel sheet was 50% or more as compared with the maximum thickness content therein, it was judged to be acceptable.

The existence of the patternlike defects was visually observed after scrubbing the surface of the galvannealed steel sheet with the grindstone. The scrubbing with the grindstone simulated the abrasion at the press-forming. By the method, it was possible to generally judge whether the patternlike defects would appear or not after the actual press-forming. In the Table 5, "Good" indicates that the patternlike defects did not appear after conducting the method in the galvannealed steel sheet, and "Bad" indicates that the patternlike defects appeared in the galvannealed steel sheet.

The results are shown in the following Tables. Table 4 shows the tensile strength, the elongation, and the $r_{ave}$ value as the mechanical properties. Table 5 shows the segregating situation of P, Ni, and Cu in the scale-removed rolled steel sheet, the unevenness of the P content in the galvannealed layer, the unevenness of the galvannealed layer thickness, and the existence of the patternlike defects.

As shown in the Tables 4 and 5, in the examples in the galvannealed steel sheets, the mechanical properties were satisfied, the formability was excellent, the unevenness of the P content in the galvannealed layer and the unevenness of the galvannealed layer thickness were small, and simultaneously, the patternlike defects on the surface did not appear.

On the other hand, the other galvannealed steel sheets were the comparative examples which were out of the range of the present invention.

In the Steel No. C and the Steel No. M, since the removing amount was less than GL which was the lower limit, the P, Ni, and Cu were segregated to the steel surface part even after the surface-removing process. Thus, the minimum P content in the galvannealed layer and the minimum thickness of the galvannealed layer were less than 50% as compared with the maximum therein, and the linear pattern defects appeared.

In the Steel No. G and the Steel No. J, the removing amount was more than the upper limit. Thus, the removing amount was not optimum and excessive, it took time for the removing, and thus, the cost rose.

In the Steel No. Q which was the comparative example, the P content was more than the upper limit Thus, in the galvannealed steel sheet, the alloying rate delayed, the surface quality became uneven, and the linear pattern defects partially appeared.

In the Steel No. R which was the comparative example, the Mn content was more than the upper limit. Thus, in the galvannealed steel sheet, the r value was the low value such as 1.1. Also, since the galvanizability deteriorated, the linear pattern defects partially appeared.

In the Steel No. S which was the comparative example, the C content was more than the upper limit, and the removing amount was more than the upper limit. Thus, in the galvannealed steel sheet, since the r value was 0.9, the formability was insufficient. Also, since the removing amount was not optimum and excessive, the cost rose.

In the Steel No. T which was the comparative example, the Ti content was more than the upper limit. Thus, in the galvannealed steel sheet, since the r value was 0.9, the formability was insufficient.

In the Steel No. U which was the comparative example, the Ni content was more than the upper limit. In the Steel No. V which was the comparative example, the Cu content was more than the upper limit. In addition, in the galvannealed steel sheets, the removing amount was less than the lower limit. Thus, in the galvannealed steel sheets, the surface quality became uneven, and the pattern defects appeared.

In the Steel No. W which was the comparative example, the Nb content was more than the upper limit. Thus, in the galvannealed steel sheet, since the r value was 1.1, the formability was insufficient.

In the Steel No. KK which was the comparative example, the C content was less than the lower limit. Thus, in the galvannealed steel sheet, since the steel making needed to be excessively conducted in order to decrease the C content, the cost rose.

In the Steel No. LL which was the comparative example, the C content was more than the upper limit. Thus, in the galvannealed steel sheet, the formability was insufficient.

In the Steel No. MM which was the comparative example, the Si content was less than the lower limit. Thus, in the galvannealed steel sheet, the tensile strength was insufficient.

In the Steel No. NN which was the comparative example, the Si content was more than the upper limit. Thus, in the galvannealed steel sheet, the formability was insufficient.

In the Steel No. OO which was the comparative example, the Mn content was less than the lower limit. Thus, in the galvannealed steel sheet, the tensile strength was insufficient.

In the Steel No. PP which was the comparative example, the P content was less than the lower limit. Thus, in the galvannealed steel sheet, the tensile strength was insufficient.

In the Steel No. QQ which was the comparative example, the Al content was less than the lower limit. Thus, in the galvannealed steel sheet, since the deoxidation was insufficient and the oxides remained, the formability was insufficient.

In the Steel No. RR which was the comparative example, the Al content was more than the upper limit Thus, in the galvannealed steel sheet, the formability was insufficient.

In the Steel No. SS which was the comparative example, the S content was more than the upper limit. Thus, in the galvannealed steel sheet, the formability was insufficient.

In the Steel No. TT which was the comparative example, the B content was more than the upper limit. Thus, in the galvannealed steel sheet, the formability was insufficient.

In the Steel No. UU which was the comparative example, the heating temperature in the heating process was lower than the lower limit, and the finishing temperature in the hot-rolling process was lower than the lower limit. Thus, in the galvannealed steel sheet, the formability was insufficient.

In the Steel No. VV which was the comparative example, the finishing temperature in the hot-rolling process was lower than the lower limit. Thus, in the galvannealed steel sheet, the formability was insufficient.

In the Steel No. WW which was the comparative example, the coiling temperature in the hot-rolling process was lower than the lower limit. Thus, in the galvannealed steel sheet, since the defective shape occurred, the product was not usable.

In the Steel No. XX which was the comparative example, the coiling temperature in the hot-rolling process was higher than the upper limit. Thus, in the galvannealed steel sheet, since the scale defects were excessive, the product was not usable.

In the Steel No. AB which was the comparative example, the Mo content was more than the upper limit. Thus, in the galvannealed steel sheet, the formability was insufficient.

In the Steel No. AC which was the comparative example, the N content was more than the upper limit Thus, in the galvannealed steel sheet, the formability was insufficient.

TABLE 1

| STEEL No. | C (mass %) | Si (mass %) | Mn (mass %) | P (mass %) | Al (mass %) | S (mass %) | Ni (mass %) | Cu (mass %) | N (mass %) | B (mass %) | Nb (mass %) | Ti (mass %) | Mo (mass %) |
|---|---|---|---|---|---|---|---|---|---|---|---|---|---|
| A | 0.0007 | 0.004 | 0.11 | 0.010 | 0.030 | 0.003 | 0.010 | 0.010 | 0.002 | 0.0006 | | 0.070 | |
| B | 0.0015 | 0.015 | 2.00 | 0.015 | 0.040 | 0.006 | 0.005 | 0.020 | 0.002 | 0.0004 | 0.011 | | |
| C | 0.0020 | 0.010 | 0.13 | 0.006 | 0.050 | 0.012 | 0.050 | 0.010 | 0.003 | | 0.015 | 0.02 | |
| D | 0.0005 | 0.010 | 0.20 | 0.010 | 0.035 | 0.010 | 0.020 | 0.050 | 0.002 | | | | |
| E | 0.0005 | 0.020 | 0.18 | 0.008 | 0.060 | 0.020 | 0.030 | 0.005 | 0.003 | | | | |
| F | 0.0022 | 0.007 | 0.57 | 0.023 | 0.050 | 0.006 | 0.010 | 0.015 | 0.002 | 0.0012 | 0.013 | | |
| G | 0.0055 | 0.040 | 0.65 | 0.045 | 0.030 | 0.020 | 0.015 | 0.004 | 0.002 | 0.0015 | 0.020 | 0.01 | |
| H | 0.0032 | 0.440 | 0.40 | 0.020 | 0.043 | 0.013 | 0.024 | 0.011 | 0.002 | | | | |
| I | 0.0040 | 0.040 | 0.65 | 0.045 | 0.075 | 0.020 | 0.037 | 0.026 | 0.002 | 0.0025 | 0.027 | | |
| J | 0.0021 | 0.008 | 0.30 | 0.018 | 0.060 | 0.012 | 0.015 | 0.010 | 0.002 | 0.0013 | 0.017 | 0.02 | |
| K | 0.0050 | 0.034 | 0.45 | 0.045 | 0.070 | 0.020 | 0.040 | 0.040 | 0.002 | 0.0015 | | 0.030 | |
| L | 0.0035 | 0.023 | 0.80 | 0.015 | 0.022 | 0.014 | 0.016 | 0.029 | 0.003 | | | 0.028 | |
| M | 0.0025 | 0.250 | 0.10 | 0.080 | 0.050 | 0.018 | 0.020 | 0.015 | 0.002 | | 0.020 | 0.01 | |
| N | 0.0028 | 0.294 | 1.20 | 0.059 | 0.060 | 0.015 | 0.030 | 0.004 | 0.002 | 0.0035 | | 0.095 | |
| O | 0.0022 | 0.550 | 1.20 | 0.027 | 0.050 | 0.003 | 0.002 | 0.005 | 0.002 | 0.0015 | 0.030 | 0.03 | |
| P | 0.0035 | 0.950 | 1.50 | 0.100 | 0.080 | 0.015 | 0.010 | 0.002 | 0.002 | | | 0.080 | |
| Q | 0.0034 | 0.021 | 0.11 | 0.200 | 0.050 | 0.005 | 0.042 | 0.020 | 0.002 | | | | |
| R | 0.0018 | 0.012 | 2.80 | 0.010 | 0.035 | 0.016 | 0.024 | 0.033 | 0.005 | | 0.050 | | |
| S | 0.0300 | 0.040 | 0.42 | 0.023 | 0.070 | 0.010 | 0.010 | 0.020 | 0.002 | 0.0048 | | 0.05 | |
| T | 0.0100 | 0.360 | 0.10 | 0.015 | 0.060 | 0.013 | 0.020 | 0.016 | 0.002 | | | 0.30 | |
| U | 0.0031 | 0.546 | 1.06 | 0.040 | 0.045 | 0.011 | 0.300 | 0.013 | 0.003 | 0.0007 | 0.016 | | |
| V | 0.0021 | 0.360 | 1.43 | 0.070 | 0.054 | 0.014 | 0.030 | 0.500 | 0.002 | | | | |
| W | 0.0018 | 0.550 | 1.24 | 0.054 | 0.045 | 0.007 | 0.020 | 0.010 | 0.002 | 0.0008 | 0.500 | 0.02 | |
| X | 0.0095 | 0.008 | 1.10 | 0.050 | 0.043 | 0.013 | 0.024 | 0.011 | 0.002 | | | | |
| Y | 0.0020 | 0.008 | 0.02 | 0.050 | 0.043 | 0.013 | 0.024 | 0.011 | 0.002 | | | | |
| Z | 0.0020 | 0.008 | 1.10 | 0.050 | 0.043 | 0.013 | 0.093 | 0.011 | 0.002 | | | | |
| AA | 0.0020 | 0.008 | 1.10 | 0.050 | 0.043 | 0.013 | 0.024 | 0.096 | 0.002 | | | | |
| BB | 0.0020 | 0.008 | 1.10 | 0.050 | 0.043 | 0.013 | 0.024 | 0.011 | 0.002 | 0.0001 | | | |
| CC | 0.0020 | 0.008 | 1.10 | 0.050 | 0.043 | 0.013 | 0.024 | 0.011 | 0.002 | 0.0027 | | | |
| DD | 0.0020 | 0.008 | 1.10 | 0.050 | 0.043 | 0.013 | 0.024 | 0.011 | 0.002 | | 0.001 | | |
| EE | 0.0020 | 0.008 | 1.10 | 0.050 | 0.043 | 0.013 | 0.024 | 0.011 | 0.002 | | 0.090 | | |
| FF | 0.0020 | 0.008 | 1.10 | 0.050 | 0.043 | 0.013 | 0.024 | 0.011 | 0.002 | | | 0.001 | |
| GG | 0.0020 | 0.008 | 1.10 | 0.050 | 0.043 | 0.013 | 0.024 | 0.011 | 0.002 | | | 0.050 | |
| HH | 0.0020 | 0.008 | 1.10 | 0.050 | 0.043 | 0.013 | 0.024 | 0.011 | 0.002 | 0.00008 | | | |
| II | 0.0020 | 0.008 | 1.10 | 0.050 | 0.043 | 0.013 | 0.024 | 0.011 | 0.002 | | 0.0007 | | |
| JJ | 0.0020 | 0.008 | 1.10 | 0.050 | 0.043 | 0.013 | 0.024 | 0.011 | 0.002 | | | 0.0008 | |
| KK | 0.0004 | 0.008 | 1.10 | 0.050 | 0.043 | 0.013 | 0.024 | 0.011 | 0.002 | | | | |
| LL | 0.0110 | 0.008 | 1.10 | 0.050 | 0.043 | 0.013 | 0.024 | 0.011 | 0.002 | | | | |
| MM | 0.0020 | 0.0008 | 0.01 | 0.005 | 0.043 | 0.013 | 0.024 | 0.011 | 0.002 | | | | |
| NN | 0.0020 | 1.100 | 1.10 | 0.050 | 0.043 | 0.013 | 0.024 | 0.011 | 0.002 | | | | |
| OO | 0.0020 | 0.008 | 0.009 | 0.005 | 0.043 | 0.013 | 0.024 | 0.011 | 0.002 | | | | |
| PP | 0.0020 | 0.008 | 0.01 | 0.003 | 0.043 | 0.013 | 0.024 | 0.011 | 0.002 | | | | |
| QQ | 0.0020 | 0.008 | 1.10 | 0.050 | 0.008 | 0.013 | 0.024 | 0.011 | 0.002 | | | | |

TABLE 1-continued

| | CHEMICAL COMPOSITION | | | | | | | | | | | | |
|---|---|---|---|---|---|---|---|---|---|---|---|---|---|
| STEEL No. | C (mass %) | Si (mass %) | Mn (mass %) | P (mass %) | Al (mass %) | S (mass %) | Ni (mass %) | Cu (mass %) | N (mass %) | B (mass %) | Nb (mass %) | Ti (mass %) | Mo (mass %) |
| RR | 0.0020 | 0.008 | 1.10 | 0.050 | 0.120 | 0.013 | 0.024 | 0.011 | 0.002 | | | | |
| SS | 0.0020 | 0.008 | 1.10 | 0.050 | 0.043 | 0.022 | 0.024 | 0.011 | 0.002 | | | | |
| TT | 0.0020 | 0.008 | 1.10 | 0.050 | 0.043 | 0.013 | 0.024 | 0.011 | 0.002 | 0.0052 | | | |
| UU | 0.0020 | 0.008 | 1.10 | 0.050 | 0.043 | 0.013 | 0.024 | 0.011 | 0.002 | | | | |
| VV | 0.0020 | 0.008 | 1.10 | 0.050 | 0.043 | 0.013 | 0.024 | 0.011 | 0.002 | | | | |
| WW | 0.0020 | 0.008 | 1.10 | 0.050 | 0.043 | 0.013 | 0.024 | 0.011 | 0.002 | | | | |
| XX | 0.0020 | 0.008 | 1.10 | 0.050 | 0.043 | 0.013 | 0.024 | 0.011 | 0.002 | | | | |
| YY | 0.0020 | 0.008 | 1.10 | 0.050 | 0.043 | 0.013 | 0.024 | 0.011 | 0.002 | | | | |
| ZZ | 0.0030 | 0.011 | 0.57 | 0.020 | 0.050 | 0.006 | 0.010 | 0.020 | 0.003 | 0.0014 | 0.015 | 0.001 | 0.024 |
| AB | 0.0040 | 0.014 | 0.62 | 0.017 | 0.058 | 0.008 | 0.010 | 0.035 | 0.003 | 0.0012 | 0.016 | | 0.150 |
| AC | 0.0020 | 0.008 | 1.10 | 0.050 | 0.043 | 0.012 | 0.024 | 0.011 | 0.012 | | | | |
| AD | 0.0020 | 0.008 | 1.10 | 0.050 | 0.043 | 0.013 | 0.024 | 0.011 | 0.002 | | | | 0.0009 |

TABLE 2

| | HEATING PROCESS | HOT-ROLLING PROCESS | | PICKLING PROCESS | SURFACE-REMOVING PROCESS | | | | | |
|---|---|---|---|---|---|---|---|---|---|---|
| | | | | | | | Ni AND Cu CONTENTS IN STEEL SURFACE PART | | OPTIMUM RANGE OF REMOVING AMOUNT | |
| STEEL No. | HEATING TEMPERATURE (° C.) | FINISHING TEMPERATURE (° C.) | COILING TEMPERATURE (° C.) | PICKLING BEFORE SURFACE-REMOVING PROCESS | SURFACE-REMOVING METHOD | REMOVING AMOUNT (μm) | Ni$_{max}$ (mass %) | Cu$_{max}$ (mass %) | GL (μm) | GU (μm) |
| A | 1230 | 905 | 650 | C.O. | GRINDER | 0.7 | 0.108 | 0.120 | 0.041 | 0.816 |
| B | 1230 | 905 | 650 | C.O. | WIRE BRUSH ROLL | 0.35 | 0.089 | 0.308 | 0.067 | 1.342 |
| C | 1230 | 905 | 650 | C.O. | WIRE BRUSH ROLL | 0.1 | 1.120 | 0.186 | 0.254 | 5.075 |
| D | 1230 | 905 | 650 | Not C.O. | GRINDER | 1.5 | 0.300 | 0.815 | 0.190 | 3.808 |
| E | 1230 | 905 | 650 | C.O. | WIRE BRUSH ROLL | 0.3 | 0.258 | 0.047 | 0.059 | 1.182 |
| F | 1230 | 905 | 650 | C.O. | SHOT BLASTING | 0.5 | 0.130 | 0.125 | 0.046 | 0.920 |
| G | 1230 | 905 | 650 | C.O. | GRINDER | 0.7 | 0.090 | 0.049 | 0.026 | 0.517 |
| H | 1230 | 905 | 650 | C.O. | GRINDER | 0.6 | 0.139 | 0.055 | 0.037 | 0.732 |
| I | 1230 | 905 | 650 | C.O. | WIRE BRUSH ROLL | 0.15 | 0.477 | 0.299 | 0.143 | 2.865 |
| J | 1230 | 905 | 650 | C.O. | GRINDER | 2.3 | 0.170 | 0.068 | 0.045 | 0.898 |
| K | 1230 | 905 | 650 | C.O. | GRINDER | 0.8 | 0.348 | 0.348 | 0.125 | 2.506 |
| L | 1230 | 905 | 650 | C.O. | GRINDER | 0.4 | 0.157 | 0.229 | 0.068 | 1.361 |
| M | 1230 | 905 | 650 | C.O. | WIRE BRUSH ROLL | 0.06 | 0.328 | 0.186 | 0.095 | 1.907 |
| N | 1230 | 905 | 650 | C.O. | WIRE BRUSH ROLL | 0.95 | 0.237 | 0.045 | 0.055 | 1.092 |
| O | 1230 | 905 | 650 | C.O. | GRINDER | 0.1 | 0.013 | 0.042 | 0.009 | 0.186 |
| P | 1230 | 905 | 650 | C.O. | WIRE BRUSH ROLL | 0.6 | 0.253 | 0.040 | 0.057 | 1.140 |
| Q | 1230 | 905 | 650 | C.O. | GRINDER | 1.1 | 0.281 | 0.108 | 0.073 | 1.470 |
| R | 1230 | 905 | 650 | C.O. | SHOT BLASTING | 1.45 | 0.226 | 0.284 | 0.091 | 1.813 |
| S | 1230 | 905 | 650 | C.O. | GRINDER | 2.1 | 0.146 | 0.288 | 0.075 | 1.506 |
| T | 1230 | 905 | 650 | C.O. | WIRE BRUSH ROLL | 0.6 | 0.350 | 0.286 | 0.116 | 2.315 |
| U | 1230 | 905 | 650 | C.O. | GRINDER | 0.4 | 2.700 | 0.096 | 0.555 | 11.107 |
| V | 1230 | 905 | 650 | C.O. | WIRE BRUSH ROLL | 0.5 | 0.150 | 2.950 | 0.502 | 10.040 |
| W | 1230 | 905 | 650 | C.O. | GRINDER | 0.6 | 0.148 | 0.069 | 0.041 | 0.813 |
| X | 1230 | 905 | 650 | C.O. | GRINDER | 0.6 | 0.139 | 0.055 | 0.037 | 0.732 |
| Y | 1230 | 905 | 650 | Not C.O. | GRINDER | 0.6 | 0.139 | 0.055 | 0.037 | 0.732 |
| Z | 1230 | 905 | 650 | C.O. | GRINDER | 0.6 | 0.539 | 0.055 | 0.117 | 2.332 |
| AA | 1230 | 905 | 650 | C.O. | GRINDER | 0.6 | 0.139 | 0.480 | 0.105 | 2.092 |
| BB | 1230 | 905 | 650 | C.O. | GRINDER | 0.6 | 0.139 | 0.055 | 0.037 | 0.732 |
| CC | 1230 | 905 | 650 | C.O. | GRINDER | 0.6 | 0.139 | 0.055 | 0.037 | 0.732 |
| DD | 1230 | 905 | 650 | C.O. | GRINDER | 0.6 | 0.139 | 0.055 | 0.037 | 0.732 |
| EE | 1230 | 905 | 650 | C.O. | GRINDER | 0.6 | 0.139 | 0.055 | 0.037 | 0.732 |
| FF | 1230 | 905 | 650 | C.O. | GRINDER | 0.6 | 0.139 | 0.055 | 0.037 | 0.732 |
| GG | 1230 | 905 | 650 | C.O. | GRINDER | 0.6 | 0.139 | 0.055 | 0.037 | 0.732 |
| HH | 1230 | 905 | 650 | C.O. | GRINDER | 0.6 | 0.139 | 0.055 | 0.037 | 0.732 |

TABLE 2-continued

| | HEATING PROCESS | HOT-ROLLING PROCESS | PICKLING PROCESS | SURFACE-REMOVING PROCESS | | | | | |
|---|---|---|---|---|---|---|---|---|---|
| | | FIN-ISHING | PICKLING | | | | Ni AND Cu CONTENTS IN STEEL SURFACE PART | | OPTIMUM RANGE OF |
| | HEATING | | COILING | BEFORE | | REMOVING | | | REMOVING AMOUNT |
| | TEMPER- | TEMPER- | TEMPER- | SURFACE- | SURFACE- | AMOUNT | $Ni_{max}$ | $Cu_{max}$ | GL | GU |
| STEEL No. | ATURE (° C.) | ATURE (° C.) | ATURE (° C.) | REMOVING PROCESS | REMOVING METHOD | (μm) | (mass %) | (mass %) | (μm) | (μm) |
| II | 1230 | 905 | 650 | C.O. | GRINDER | 0.6 | 0.139 | 0.055 | 0.037 | 0.732 |
| JJ | 1230 | 905 | 650 | C.O. | GRINDER | 0.6 | 0.139 | 0.055 | 0.037 | 0.732 |
| KK | 1230 | 905 | 650 | C.O. | GRINDER | 0.6 | 0.139 | 0.055 | 0.037 | 0.732 |
| LL | 1230 | 905 | 650 | C.O. | GRINDER | 0.6 | 0.139 | 0.055 | 0.037 | 0.732 |
| MM | 1230 | 905 | 650 | C.O. | GRINDER | 0.6 | 0.139 | 0.055 | 0.037 | 0.732 |
| NN | 1230 | 905 | 650 | C.O. | GRINDER | 0.6 | 0.139 | 0.055 | 0.037 | 0.732 |
| OO | 1230 | 905 | 650 | C.O. | GRINDER | 0.6 | 0.139 | 0.055 | 0.037 | 0.732 |
| PP | 1230 | 905 | 650 | C.O. | GRINDER | 0.6 | 0.139 | 0.055 | 0.037 | 0.732 |
| QQ | 1230 | 905 | 650 | C.O. | GRINDER | 0.6 | 0.139 | 0.055 | 0.037 | 0.732 |
| RR | 1230 | 905 | 650 | C.O. | GRINDER | 0.6 | 0.139 | 0.055 | 0.037 | 0.732 |
| SS | 1230 | 905 | 650 | C.O. | GRINDER | 0.6 | 0.139 | 0.055 | 0.037 | 0.732 |
| TT | 1230 | 905 | 650 | C.O. | GRINDER | 0.6 | 0.139 | 0.055 | 0.037 | 0.732 |
| UU | 1080 | 780 | 650 | C.O. | GRINDER | 0.6 | 0.139 | 0.055 | 0.037 | 0.732 |
| VV | 1230 | 790 | 650 | C.O. | GRINDER | 0.6 | 0.139 | 0.055 | 0.037 | 0.732 |
| WW | 1230 | 905 | 480 | Not C.O. | — | Not C.O. | — | — | — | — |
| XX | 1230 | 905 | 810 | Not C.O. | — | Not C.O. | — | — | — | — |
| YY | 1230 | 905 | 650 | Not C.O. | GRINDER | 0.6 | 0.139 | 0.055 | 0.037 | 0.732 |
| ZZ | 1230 | 905 | 650 | C.O. | SHOT BLASTING | 0.5 | 0.130 | 0.166 | 0.053 | 1.051 |
| AB | 1230 | 905 | 650 | C.O. | SHOT BLASTING | 0.5 | 0.130 | 0.291 | 0.072 | 1.450 |
| AC | 1230 | 905 | 650 | C.O. | GRINDER | 0.6 | 0.139 | 0.055 | 0.037 | 0.732 |
| AD | 1230 | 905 | 650 | C.O. | GRINDER | 0.6 | 0.139 | 0.055 | 0.037 | 0.732 |

TABLE 3

| STEEL No. | PICKLING PROCESS PICKLING AFTER SURFACE-REMOVING PROCESS | COLD-ROLLING PROCESS "C.O." OR "NOT C.O." | COLD REDUCTION (%) | ANNEALING PROCESS "C.O." OR "NOT C.O." | ANNEALING TEMPERATURE (° C.) | GALVANIZING PROCESS "C.O." OR "NOT C.O." | GALVAN-NEALING PROCESS "C.O." OR "NOT C.O." |
|---|---|---|---|---|---|---|---|
| A | C.O. | C.O. | 80 | C.O. | 790 | C.O. | C.O. |
| B | C.O. | C.O. | 80 | C.O. | 790 | C.O. | C.O. |
| C | C.O. | C.O. | 80 | C.O. | 790 | C.O. | C.O. |
| D | C.O. | C.O. | 80 | C.O. | 790 | C.O. | C.O. |
| E | C.O. | C.O. | 80 | C.O. | 790 | C.O. | C.O. |
| F | C.O. | C.O. | 80 | C.O. | 790 | C.O. | C.O. |
| G | C.O. | C.O. | 80 | C.O. | 790 | C.O. | C.O. |
| H | C.O. | C.O. | 80 | C.O. | 790 | C.O. | C.O. |
| I | C.O. | C.O. | 80 | C.O. | 790 | C.O. | C.O. |
| J | C.O. | C.O. | 80 | C.O. | 790 | C.O. | C.O. |
| K | C.O. | C.O. | 80 | C.O. | 790 | C.O. | C.O. |
| L | C.O. | C.O. | 80 | C.O. | 790 | C.O. | C.O. |
| M | C.O. | C.O. | 80 | C.O. | 790 | C.O. | C.O. |
| N | C.O. | C.O. | 80 | C.O. | 790 | C.O. | C.O. |
| O | C.O. | C.O. | 80 | C.O. | 790 | C.O. | C.O. |
| P | C.O. | C.O. | 80 | C.O. | 790 | C.O. | C.O. |
| Q | C.O. | C.O. | 80 | C.O. | 790 | C.O. | C.O. |
| R | C.O. | C.O. | 80 | C.O. | 790 | C.O. | C.O. |
| S | C.O. | C.O. | 80 | C.O. | 790 | C.O. | C.O. |
| T | C.O. | C.O. | 80 | C.O. | 790 | C.O. | C.O. |
| U | C.O. | C.O. | 80 | C.O. | 790 | C.O. | C.O. |
| V | C.O. | C.O. | 80 | C.O. | 790 | C.O. | C.O. |
| W | C.O. | C.O. | 80 | C.O. | 790 | C.O. | C.O. |
| X | C.O. | C.O. | 80 | C.O. | 790 | C.O. | C.O. |
| Y | Not C.O. | C.O. | 80 | C.O. | 790 | C.O. | C.O. |
| Z | Not C.O. | C.O. | 80 | C.O. | 790 | C.O. | C.O. |
| AA | C.O. | C.O. | 80 | C.O. | 790 | C.O. | C.O. |
| BB | C.O. | C.O. | 80 | C.O. | 790 | C.O. | C.O. |
| CC | C.O. | Not C.O. | — | Not C.O. | — | C.O. | C.O. |
| DD | C.O. | C.O. | 80 | C.O. | 790 | C.O. | C.O. |
| EE | C.O. | C.O. | 80 | C.O. | 790 | C.O. | C.O. |

TABLE 3-continued

| STEEL No. | PICKLING PROCESS PICKLING AFTER SURFACE-REMOVING PROCESS | COLD-ROLLING PROCESS "C.O." OR "NOT C.O." | COLD REDUCTION (%) | ANNEALING PROCESS "C.O." OR "NOT C.O." | ANNEALING TEMPERATURE (° C.) | GALVANIZING PROCESS "C.O." OR "NOT C.O." | GALVAN-NEALING PROCESS "C.O." OR "NOT C.O." |
|---|---|---|---|---|---|---|---|
| FF | C.O. | C.O. | 80 | C.O. | 790 | C.O. | C.O. |
| GG | C.O. | Not C.O. | — | Not C.O. | — | C.O. | C.O. |
| HH | C.O. | C.O. | 80 | C.O. | 790 | C.O. | C.O. |
| II | C.O. | C.O. | 80 | C.O. | 790 | C.O. | C.O. |
| JJ | C.O. | C.O. | 80 | C.O. | 790 | C.O. | C.O. |
| KK | C.O. | C.O. | 80 | C.O. | 790 | C.O. | C.O. |
| LL | C.O. | C.O. | 80 | C.O. | 790 | C.O. | C.O. |
| MM | C.O. | C.O. | 80 | C.O. | 790 | C.O. | C.O. |
| NN | C.O. | C.O. | 80 | C.O. | 790 | C.O. | C.O. |
| OO | C.O. | C.O. | 80 | C.O. | 790 | C.O. | C.O. |
| PP | C.O. | C.O. | 80 | C.O. | 790 | C.O. | C.O. |
| QQ | C.O. | C.O. | 80 | C.O. | 790 | C.O. | C.O. |
| RR | C.O. | C.O. | 80 | C.O. | 790 | C.O. | C.O. |
| SS | C.O. | C.O. | 80 | C.O. | 790 | C.O. | C.O. |
| TT | C.O. | C.O. | 80 | C.O. | 790 | C.O. | C.O. |
| UU | C.O. | C.O. | 80 | C.O. | 790 | C.O. | C.O. |
| VV | C.O. | C.O. | 80 | C.O. | 790 | C.O. | C.O. |
| WW | Not C.O. | Not C.O. | — | Not C.O. | — | Not C.O. | Not C.O. |
| XX | Not C.O. | Not C.O. | — | Not C.O. | — | Not C.O. | Not C.O. |
| YY | Not C.O. | Not C.O. | — | Not C.O. | — | C.O. | C.O. |
| ZZ | C.O. | C.O. | 80 | C.O. | 790 | C.O. | C.O. |
| AB | C.O. | C.O. | 80 | C.O. | 790 | C.O. | C.O. |
| AC | C.O. | C.O. | 80 | C.O. | 790 | C.O. | C.O. |
| AD | C.O. | C.O. | 80 | C.O. | 790 | C.O. | C.O. |

TABLE 4

| STEEL No. | TENSILE STRENGTH TS (MPa) | ELONGATION EL (%) | $r_{ave}$ VALUE | |
|---|---|---|---|---|
| A | 329 | 47 | 1.9 | EXAMPLE |
| B | 440 | 37 | 1.3 | EXAMPLE |
| C | 327 | 47 | 1.8 | COMPARATIVE EXAMPLE |
| D | 335 | 46 | 1.7 | EXAMPLE |
| E | 336 | 46 | 1.8 | EXAMPLE |
| F | 366 | 44 | 1.6 | EXAMPLE |
| G | 394 | 41 | 1.5 | COMPARATIVE EXAMPLE |
| H | 405 | 41 | 1.5 | EXAMPLE |
| I | 395 | 41 | 1.6 | EXAMPLE |
| J | 347 | 45 | 1.7 | COMPARATIVE EXAMPLE |
| K | 383 | 42 | 1.6 | EXAMPLE |
| L | 374 | 43 | 1.7 | EXAMPLE |
| M | 420 | 39 | 1.4 | COMPARATIVE EXAMPLE |
| N | 463 | 35 | 1.2 | EXAMPLE |
| O | 465 | 35 | 1.2 | EXAMPLE |
| P | 575 | 26 | 1.2 | EXAMPLE |
| Q | 504 | 32 | 1.2 | COMPARATIVE EXAMPLE |
| R | 469 | 34 | 1.1 | COMPARATIVE EXAMPLE |
| S | 497 | 32 | 0.9 | COMPARATIVE EXAMPLE |
| T | 395 | 42 | 0.9 | COMPARATIVE EXAMPLE |
| U | 474 | 34 | 1.2 | COMPARATIVE EXAMPLE |
| V | 475 | 33 | 1.2 | COMPARATIVE EXAMPLE |
| W | 491 | 33 | 1.1 | COMPARATIVE EXAMPLE |
| X | 455 | 36 | 1.2 | EXAMPLE |
| Y | 363 | 44 | 1.5 | EXAMPLE |
| Z | 420 | 43 | 1.4 | EXAMPLE |
| AA | 409 | 40 | 1.4 | EXAMPLE |
| BB | 415 | 39 | 1.4 | EXAMPLE |
| CC | 436 | 38 | 1.3 | EXAMPLE |
| DD | 413 | 40 | 1.4 | EXAMPLE |
| EE | 442 | 37 | 1.3 | EXAMPLE |
| FF | 417 | 39 | 1.4 | EXAMPLE |
| GG | 435 | 38 | 1.3 | EXAMPLE |
| HH | 405 | 40 | 1.4 | EXAMPLE |
| II | 405 | 41 | 1.4 | EXAMPLE |
| JJ | 405 | 41 | 1.4 | EXAMPLE |
| KK | 378 | 43 | 1.7 | COMPARATIVE EXAMPLE |
| LL | 460 | 35 | 1.1 | COMPARATIVE EXAMPLE |
| MM | 315 | 47 | 1.8 | COMPARATIVE EXAMPLE |
| NN | 545 | 24 | 0.9 | COMPARATIVE EXAMPLE |
| OO | 313 | 48 | 1.8 | COMPARATIVE EXAMPLE |
| PP | 302 | 47 | 1.8 | COMPARATIVE EXAMPLE |
| QQ | 435 | 24 | 0.9 | COMPARATIVE EXAMPLE |
| RR | 478 | 32 | 1.1 | COMPARATIVE EXAMPLE |
| SS | 405 | 36 | 1.0 | COMPARATIVE EXAMPLE |
| TT | 456 | 34 | 1.0 | COMPARATIVE EXAMPLE |
| UU | 564 | 26 | 0.9 | COMPARATIVE EXAMPLE |
| VV | 551 | 27 | 1.0 | COMPARATIVE EXAMPLE |
| WW | — | — | — | COMPARATIVE EXAMPLE |
| XX | — | — | — | COMPARATIVE |

TABLE 4-continued

| STEEL No. | TENSILE STRENGTH TS (MPa) | ELONGATION EL (%) | $r_{ave}$ VALUE | |
|---|---|---|---|---|
| YY | 402 | 41 | 1.4 | EXAMPLE |
| ZZ | 345 | 41 | 1.6 | EXAMPLE |
| AB | 486 | 31 | 1.1 | COMPARATIVE EXAMPLE |
| AC | 472 | 34 | 1.0 | COMPARATIVE EXAMPLE |
| AD | 405 | 40 | 1.4 | EXAMPLE |

TABLE 5

| STEEL No. | SEGREGATING SITUATION OF P, Ni, AND Cu IN SCALE-REMOVED ROLLED STEEL SHEET (SURFACE PART ÷ BASE PART) | | | UNEVENNESS OF GALVANNEALED LAYER (MINIMUM ÷ MAXIMUM) | | EXISTENCE OF LINEAR PATTERN DEFECTS "Good" OR "Bad" | REMARKS | |
|---|---|---|---|---|---|---|---|---|
| | P (%) | Ni (%) | Cu (%) | P CONTENT (%) | LAYER THICKNESS (%) | | | |
| A | 115 | 113 | 111 | 77 | 85 | Good | — | EXAMPLE |
| B | 139 | 142 | 135 | 68 | 75 | Good | — | EXAMPLE |
| C | 169 | 183 | 179 | 40 | 42 | Bad | — | COMPARATIVE EXAMPLE |
| D | 134 | 131 | 129 | 77 | 89 | Good | — | EXAMPLE |
| E | 145 | 139 | 144 | 61 | 72 | Good | — | EXAMPLE |
| F | 124 | 132 | 129 | 72 | 87 | Good | — | EXAMPLE |
| G | 103 | 102 | 101 | 79 | 92 | Good | COST ROSE | COMPARATIVE EXAMPLE |
| H | 113 | 116 | 118 | 70 | 84 | Good | — | EXAMPLE |
| I | 135 | 128 | 126 | 65 | 68 | Good | — | EXAMPLE |
| J | 99 | 101 | 102 | 75 | 92 | Good | COST ROSE | COMPARATIVE EXAMPLE |
| K | 139 | 145 | 141 | 82 | 93 | Good | — | EXAMPLE |
| L | 132 | 125 | 141 | 66 | 79 | Good | — | EXAMPLE |
| M | 178 | 181 | 173 | 8 | 31 | Bad | — | COMPARATIVE EXAMPLE |
| N | 105 | 106 | 106 | 75 | 84 | Good | — | EXAMPLE |
| O | 110 | 108 | 109 | 87 | 86 | Good | — | EXAMPLE |
| P | 125 | 118 | 123 | 75 | 74 | Good | — | EXAMPLE |
| Q | 125 | 118 | 116 | 47 | 43 | Bad | — | COMPARATIVE EXAMPLE |
| R | 107 | 105 | 108 | 72 | 94 | Good | — | COMPARATIVE EXAMPLE |
| S | 104 | 103 | 103 | 81 | 92 | Good | COST ROSE | COMPARATIVE EXAMPLE |
| T | 150 | 149 | 147 | 77 | 74 | Good | — | COMPARATIVE EXAMPLE |
| U | 168 | 172 | 165 | 22 | 39 | Bad | — | COMPARATIVE EXAMPLE |
| V | 155 | 163 | 161 | 17 | 46 | Bad | — | COMPARATIVE EXAMPLE |
| W | 123 | 131 | 138 | 68 | 76 | Good | — | COMPARATIVE EXAMPLE |
| X | 113 | 116 | 118 | 70 | 84 | Good | — | EXAMPLE |
| Y | 113 | 116 | 118 | 70 | 84 | Good | — | EXAMPLE |
| Z | 143 | 141 | 136 | 58 | 59 | Good | — | EXAMPLE |
| AA | 141 | 136 | 143 | 56 | 57 | Good | — | EXAMPLE |
| BB | 113 | 116 | 118 | 70 | 84 | Good | — | EXAMPLE |
| CC | 113 | 116 | 118 | 70 | 84 | Good | — | EXAMPLE |
| DD | 113 | 116 | 118 | 70 | 84 | Good | — | EXAMPLE |
| EE | 113 | 116 | 118 | 70 | 84 | Good | — | EXAMPLE |
| FF | 113 | 116 | 118 | 70 | 84 | Good | — | EXAMPLE |
| GG | 113 | 116 | 118 | 70 | 84 | Good | — | EXAMPLE |
| HH | 113 | 116 | 118 | 70 | 84 | Good | — | EXAMPLE |
| II | 113 | 116 | 118 | 70 | 84 | Good | — | EXAMPLE |
| JJ | 113 | 116 | 118 | 70 | 84 | Good | — | EXAMPLE |
| KK | 113 | 116 | 118 | 70 | 84 | Good | COST ROSE | COMPARATIVE EXAMPLE |
| LL | 113 | 116 | 118 | 70 | 84 | Good | — | COMPARATIVE EXAMPLE |
| MM | 113 | 116 | 118 | 70 | 84 | Good | — | COMPARATIVE EXAMPLE |
| NN | 113 | 116 | 118 | 70 | 84 | Good | — | COMPARATIVE EXAMPLE |

TABLE 5-continued

| STEEL No. | SEGREGATING SITUATION OF P, Ni, AND Cu IN SCALE-REMOVED ROLLED STEEL SHEET (SURFACE PART ÷ BASE PART) | | | UNEVENNESS OF GALVANNEALED LAYER (MINIMUM ÷ MAXIMUM) | | EXISTENCE OF LINEAR PATTERN DEFECTS "Good" OR "Bad" | REMARKS | |
|---|---|---|---|---|---|---|---|---|
| | P (%) | Ni (%) | Cu (%) | P CONTENT (%) | LAYER THICKNESS (%) | | | |
| OO | 113 | 116 | 118 | 70 | 84 | Good | — | COMPARATIVE EXAMPLE |
| PP | 105 | 116 | 118 | 82 | 94 | Good | — | COMPARATIVE EXAMPLE |
| QQ | 113 | 116 | 118 | 70 | 84 | Good | — | COMPARATIVE EXAMPLE |
| RR | 113 | 116 | 118 | 70 | 84 | Good | — | COMPARATIVE EXAMPLE |
| SS | 113 | 116 | 118 | 70 | 84 | Good | — | COMPARATIVE EXAMPLE |
| TT | 113 | 116 | 118 | 70 | 84 | Good | — | COMPARATIVE EXAMPLE |
| UU | 113 | 116 | 118 | 70 | 84 | Good | — | COMPARATIVE EXAMPLE |
| VV | 113 | 116 | 118 | 70 | 84 | Good | — | COMPARATIVE EXAMPLE |
| WW | — | — | — | — | — | — | DEFECTIVE SHAPE OCCURRED | COMPARATIVE EXAMPLE |
| XX | — | — | — | — | — | — | SCALE DEFECTS | COMPARATIVE EXAMPLE |
| YY | 113 | 116 | 118 | 70 | 84 | Good | — | EXAMPLE |
| ZZ | 127 | 129 | 129 | 72 | 85 | Good | — | EXAMPLE |
| AB | 125 | 132 | 128 | 71 | 75 | Good | — | COMPARATIVE EXAMPLE |
| AC | 113 | 116 | 118 | 70 | 84 | Good | — | COMPARATIVE EXAMPLE |
| AD | 113 | 116 | 118 | 70 | 84 | Good | — | EXAMPLE |

INDUSTRIAL APPLICABILITY

According to the above aspects, it is possible to provide the galvannealed steel sheet which is subjected to the press-forming and which satisfies the mechanical properties such as tensile strength, is excellent in the formability, includes the galvannealed layer which has not many surface defects such as linear pattern defects, and simultaneously, maintains excellent surface appearance even after press-forming. Also, it is possible to provide the method for producing the same. Accordingly, the present invention has significant industrial applicability.

The invention claimed is:

1. A method for producing a galvannealed steel sheet, the method comprising:
    casting a molten steel which comprises, as a chemical composition, by mass %,
    0.0005% to 0.01% of C,
    0.001% to 1.0% of Si,
    0.01% to 2.0% of Mn,
    0.005% to 0.1% of P,
    0.01% to 0.10% of Al,
    0.02% or less of S,
    0.1% or less of Ni,
    0.1% or less of Cu,
    0.01% or less of N, and
    a balance consisting of Fe and unavoidable impurities in order to obtain a slab;
    heating the slab in 1100° C. to 1300° C.;
    hot-rolling the slab after the heating under conditions such that a finishing temperature is in 800° C. to 1050° C. and a coiling temperature is in 500° C. to 800° C. in order to obtain a hot-rolled steel sheet;
    surface-removing the hot-rolled steel sheet within a range in μm of GL expressed by a following Expression 1 or more and GU expressed by a following Expression 2 or less from an interface toward a steel along a thickness direction in order to obtain a scale-removed rolled steel sheet, when ten measurement points of the hot-rolled steel sheet are set in a transverse direction by equally dividing a line-segment having a reference length of 50 mm by 10, when a steel surface part of the hot-rolled steel sheet is from the interface between a scale and the steel to 2 μm in depth toward the steel along the thickness direction, and when a $Ni_{max}$ and a $Cu_{max}$ are respectively a maximum Ni content and a maximum Cu content in mass % of the steel surface part in the ten measurement points of the hot-rolled steel sheet;
    galvanizing the scale-removed rolled steel sheet after the surface-removing in order to obtain a galvanized steel sheet; and
    galvannealing the galvanized steel sheet after the galvanizing in order to obtain a galvannealed steel sheet, $$GL = (Ni_{max} + 0.8 \times Cu_{max}) \times 0.2 \quad \text{(Expression 1)},$$

$$GU = (Ni_{max} + 0.8 \times Cu_{max}) \times 4 \quad \text{(Expression 2)}.$$

2. The method for producing the galvannealed steel sheet according to claim 1,
    wherein the molten steel further comprises, as the chemical composition, by mass %, at least one selected from
    0.0001% to 0.0050% of B,
    0.001% to 0.1% of Nb,
    0.001% to 0.1% of Ti, and
    0.001% to 0.1% of Mo.

3. The method for producing the galvannealed steel sheet according to claim 2, the method further comprising pickling at least a surface of the hot-rolled steel sheet before the surface-removing or the scale-removed rolled steel sheet after the surface-removing.

4. The method for producing the galvannealed steel sheet according to claim 1, the method further comprising
pickling at least a surface of the hot-rolled steel sheet before the surface-removing or the scale-removed rolled steel sheet after the surface-removing.

5. The method for producing the galvannealed steel sheet according to claim 1, the method further comprising:
cold-rolling the scale-removed rolled steel sheet before the galvanizing under a cold-reduction of 50% to 95%; and
annealing the scale-removed rolled steel sheet after the cold-rolling in a temperature which is a recrystallization temperature or higher.

6. The method for producing the galvannealed steel sheet according to claim 2, the method further comprising:
cold-rolling the scale-removed rolled steel sheet before the galvanizing under a cold-reduction of 50% to 95%; and
annealing the scale-removed rolled steel sheet after the cold-rolling in a temperature which is a recrystallization temperature or higher.

7. The method for producing the galvannealed steel sheet according to claim 3, the method further comprising:
cold-rolling the scale-removed rolled steel sheet before the galvanizing under a cold-reduction of 50% to 95%; and
annealing the scale-removed rolled steel sheet after the cold-rolling in a temperature which is a recrystallization temperature or higher.

8. The method for producing the galvannealed steel sheet according to claim 4, the method further comprising:
cold-rolling the scale-removed rolled steel sheet before the galvanizing under a cold-reduction of 50% to 95%; and
annealing the scale-removed rolled steel sheet after the cold-rolling in a temperature which is a recrystallization temperature or higher.

\* \* \* \* \*